United States Patent [19]
Bretl

[11] Patent Number: 5,475,438
[45] Date of Patent: Dec. 12, 1995

[54] FIVE FIELD MOTION DETECTOR FOR A TV SCAN LINE DOUBLER

[75] Inventor: Wayne E. Bretl, Schaumburg, Ill.

[73] Assignee: Zenith Electronics Corporation, Glenview, Ill.

[21] Appl. No.: 221,133

[22] Filed: Mar. 31, 1994

[51] Int. Cl.$^6$ .................................................. H04N 7/01
[52] U.S. Cl. ............................ 348/452; 348/448; 348/450
[58] Field of Search ................................. 348/448, 450, 348/451, 452, 911, 458; H04N 7/01

[56] References Cited

U.S. PATENT DOCUMENTS

| | | | |
|---|---|---|---|
| 4,530,004 | 7/1985 | Achiha et al. | 348/450 |
| 4,533,759 | 8/1985 | Van der Meer et al. | 348/700 |
| 4,633,293 | 12/1986 | Powers | 348/443 |
| 4,937,667 | 6/1990 | Choquet et al. | 348/448 |
| 4,989,090 | 1/1991 | Campbell et al. | |
| 5,046,164 | 9/1991 | Hurst, Jr. | 348/448 |
| 5,249,037 | 9/1993 | Sugiyama et al. | 348/452 |

Primary Examiner—Victor R. Kostak

[57] ABSTRACT

A pixel interpolation system for developing progressive line scan video from two interlaced fields of video. An intrafield pixel value is determined by averaging the pixel in the line above and the line below the desired pixel. A motion value is determined by averaging the pixels in the line above and the line below the desired pixel in corresponding fields one frame before and one frame after the desired pixel, subtracting the intrafield pixel value therefrom and comparing these values with the difference of the pixels in the same spatial relationship as the desired pixel, but one field earlier and one field later. The motion value is taken as the largest of the individual values that are determined. An interfield pixel value is determined by comparing the intrafield pixel value with the corresponding pixels in the previous and subsequent frames. The motion value is used to proportion the intrafield and interfield pixel values to generate the desired pixel. A one field delay is introduced before using the interpolated pixel to check for a scene change.

8 Claims, 3 Drawing Sheets

FIVE FIELD MOTION DETECTOR FOR A TV SCAN LINE DOUBLER

BACKGROUND OF THE INVENTION AND PRIOR ART

This invention is concerned with progressive scan displays that are developed from the two fields of an interlaced scan system. The resolution of interlaced scan displays is limited due to the fact that each field, which consists of one half the total number of lines in a frame, is separately displayed, with the lines of the alternate field being black. (The lines of the next field are then displayed with the lines corresponding to the alternate field being black). In the NTSC system, interlaced fields are displayed every 1/60th second and a complete frame is displayed every 1/30th of a second. In a progressive scan display arrangement, in the simplest case, the number of scan lines visible at a given instant is twice that which is visible in a corresponding interlaced system. The conversion may be accomplished by scanning the interlaced video at twice the horizontal rate to double the number of scan lines of video information and displaying all of the real video information or pixels in both fields and interpolating the pixels in each line (that would normally be black) between the lines of real pixels in each field.

Many systems for interpolating video pixel information for progressive scan systems are known. The simplest system averages the pixel values in the lines immediately above and immediately below the interpolated or desired pixel to form an average or intrafield pixel value. While filling in the black between alternate lines, this method neither provides increased resolution nor eliminates the flicker, associated with small details, which appears primarily in one field of the scanned image. A slightly more complex method stores one field and uses it to fill the spaces in the following field. This approach is satisfactory except in the presence of motion in the video. A moving object will be in a different location in the two original fields (and presented properly in these two locations at two different times in an interlaced display), but the interpolated frame, made up of two fields, will present the object in one location on even lines and in the other location on odd lines, thus producing a double image of the object. Most interpolation systems try to compensate for the presence of motion by sampling pixel values in an area around the desired pixel and extending the sampling to fields on either side of the desired interpolated pixel. Difficulties arise in interpolating pixels in interlaced video systems because the sampling is not among pixels that are in the same spatial location in the immediately prior and immediately subsequent fields of the interpolated pixel. Also, in the event of a scene change, i.e. an event involving a substantial amount of video change, the prior art systems tend to break down.

OBJECTS OF THE INVENTION

A principal object of the invention is to provide a novel interlaced-to-progressive scan conversion method.

Another object of the invention is to provide an interlaced-to-progressive scan conversion method that uses comparisons with prior and subsequent pixels in the same spatial location as the interpolated pixel.

A further object of the invention is to provide an improved interlaced-to-progressive scan conversion system that overcomes the problems of the prior art.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
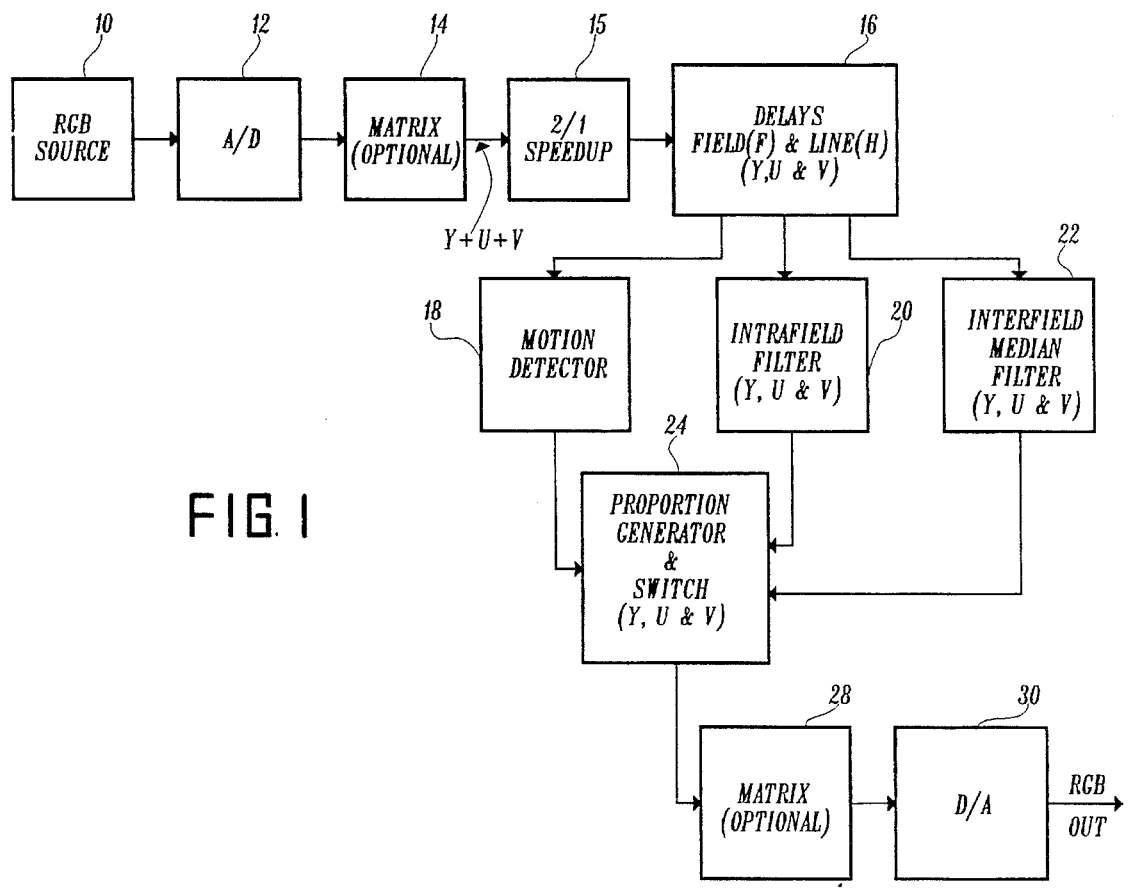
FIG. 1 is a block diagram illustrating the interlaced-to-progressive scan conversion system of the invention.

Referring to FIG. 1, an RGB source of video signals 10 is coupled to an A/D converter 12 that in turn is supplied to an optional matrix 14 which in turn is coupled to a 2:1 speed-up circuit 15 that develops an output of Y, U and V at twice the horizontal line rate of the original video signal. RGB conventionally represents the red, green and blue color video signals, whereas Y indicates the luminance component, and U and V indicate the 90° displaced color components of a video signal. The RGB signals, after conversion by the A/D converter, are (optionally) divided into the various components Y, U and V by the matrix 14. The horizontal line rate components are supplied to a 2 to 1 speed-up circuit 15. This device receives one line of video at the normal interlaced horizontal rate and outputs it at twice the normal rate, thus providing the real pixels at twice the horizontal rate with equal time between existing lines of real lines of pixels for insertion of interpolated lines of pixels. This is a well known technique and is not part of the present invention. It should be noted that all 1H delays in the drawings refer to one horizontal line at the new double rate. The speeded up Y, U and V components are supplied to a block 16 that includes a plurality of field (and line) delays. As indicated, delays are provided for each of the signals Y, U and V. The output of block 16 is supplied to a motion detector 18, an intrafield filter 20 and an interfield (median) filter 22. The outputs of motion detector 18, intrafield filter 20 and interfield filter 22 are supplied to a proportion generator and switch 24 which in turn provides an output to a matrix 26 (also optional). Proportion generator and switch 24, as will be described, includes means such as lookup tables for proportioning the amount of signal from intrafield filter 20 and interfield filter 22 that is passed to the output as determined by the motion value provided by motion detector 18. In optional matrix 28, the individual Y, U and V signals are recombined and applied to a D/A 30 to develop the progressive RGB output signal.

The input matrix 14 and the output matrix 28 are shown as optional since, while not required, they may be useful because of differences in the implementation of digital circuits representing luminance and chrominance values versus RGB values. The invention can, of course, be arranged to operate with RGB or Y, U and V signals throughout. For Y, U and V matrixing the U and V signals may be reduced in bandwidth and in number of pixels in so-called 4:2:2 digital signals, which reduces the complexity of the U and V portions of FIG. 2, while not impacting the basic operation.

Interlace-to-progressive conversion converts the number of lines and/or pixels per line in a television signal to new values. This may involve the use of vertical and/or horizontal decimation or interpolation filters, which are not part of the present invention. A vertical filter would preferably follow the interlace-to-progression conversion whereas a horizontal decimation filter would precede the conversion to reduce the number of pixels to be operated upon and handled. Obviously, if a horizontal interpolation filter that would increase the number of pixels is used, it would preferably follow the conversion.

Figure 2:
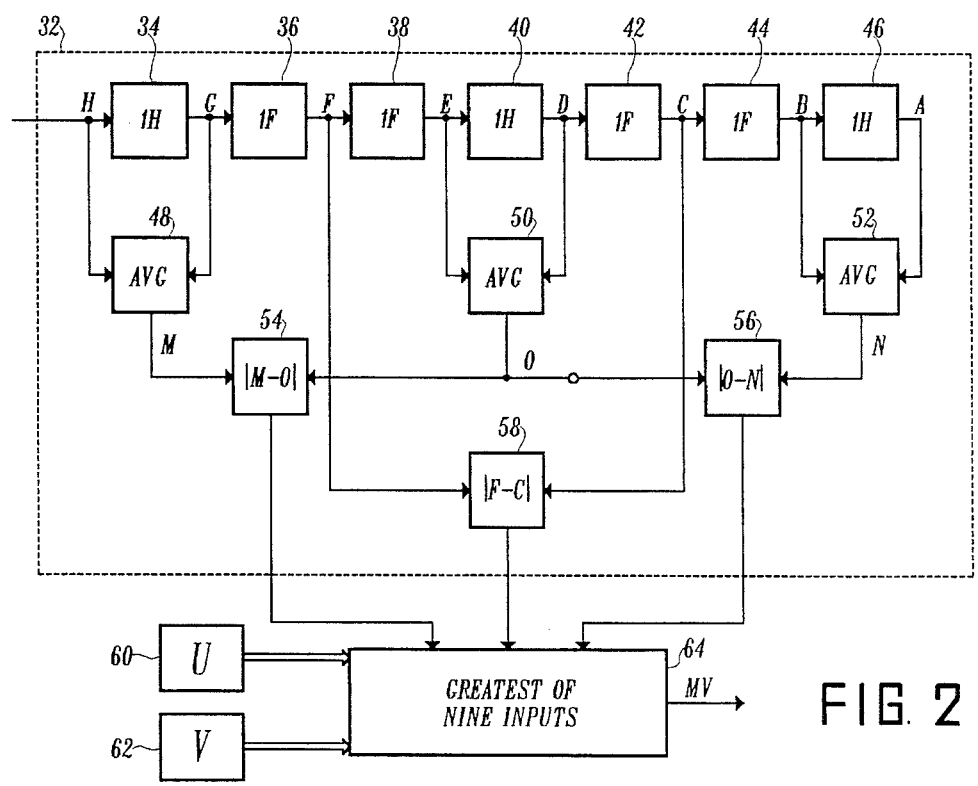
FIG. 2 is a diagram illustrating the various pixel comparisons and calculations for determining a motion value for the interpolated pixel.

In FIG. 2, the field and line delays in motion detector 18 are shown for the Y signal. The dashed line box 32 surrounding the field and line delays indicates that the circuitry therein is replicated in blocks 60 and 62 for processing of the U and V color signals. The three outputs of each block 32, 60 and 62 are supplied to a block 64 which selects the largest of the nine input signals as a motion value MV for the interpolated pixel.

The Y input signal is supplied to a 1H (one-line) delay 34, to a 1F (one-field) delay 36, a 1F delay 38, a 1H delay 40, a 1F delay 42, a 1F delay 44 and a 1H delay 46. A 1H represents a one-horizontal line delay and a 1F represents a one field delay. A 2F therefore represents a delay of one interlaced video frame. The input of delay 34 is labelled H, the junction of delays 34 and 36 is labelled G, the junction of delays 36 and 38 is labelled F, the junction of delays 38 and 40 is labelled E, that between delays 40 and 42 is labelled D, that between delays 42 and 44 is labelled C, that between delays 44 and 46 is labelled B, and the output of delay 46 is labelled A. These reference labels are used in FIG. 5 to indicate the corresponding real pixels in the interlaced video signal. The average of the values of pixels G and H is taken by a block 48 which produces an output M. The average of pixels E and D is taken by a block 50 which produces an output O and the average of pixels B and A is taken by a block 52 which produces an output N. A subtractor 54 subtracts the value of output O from output M and produces an absolute value result and a subtractor 56 subtracts the value of output O from output N and produces an absolute value result. The outputs of subtractor 54 and subtractor 56 are supplied to block 64 as inputs. Finally, the values of pixels F and C are subtracted in a subtractor 58 and the resulting absolute value output is supplied to block 64. The three inputs to block 64 from block 32 are combined with the three inputs from each of blocks 60 and 62 to provide nine inputs to block 64.

Figure 5:
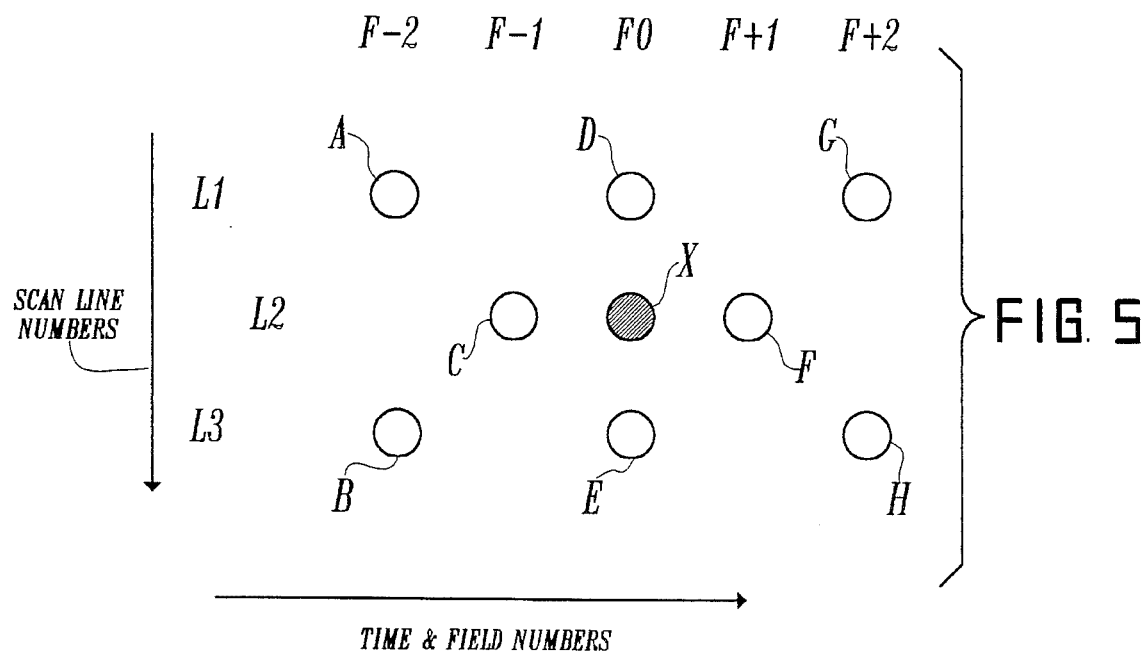
FIG. 5 is an edge view of five successive video fields showing the available interlaced lines of real pixels and the line of interpolated pixels to be derived.

With reference to FIG. 5, the pixel diagram illustrates that the average of pixels E and D represents an intrafield signal since it is the average of the pixels immediately above and immediately below the desired pixel X (i.e. the pixel to be interpolated). The interpolated pixel X is represented by a shaded circle whereas the real pixels are represented by plain circles. FIG. 5 shows the interpolated pixel X which is the one currently produced. Repeating the process in every field results in the production of interpolated lines of pixels in every field. Since the five fields shown (F−2, F−1, F0, F+1 and F+2) are interlaced, the odd numbered lines L1 and L3 are separated from the even numbered line L2 by 1/60th of a second which results in the real pixels alternating with interpolated pixels for any given line in successive fields.

Figure 3:
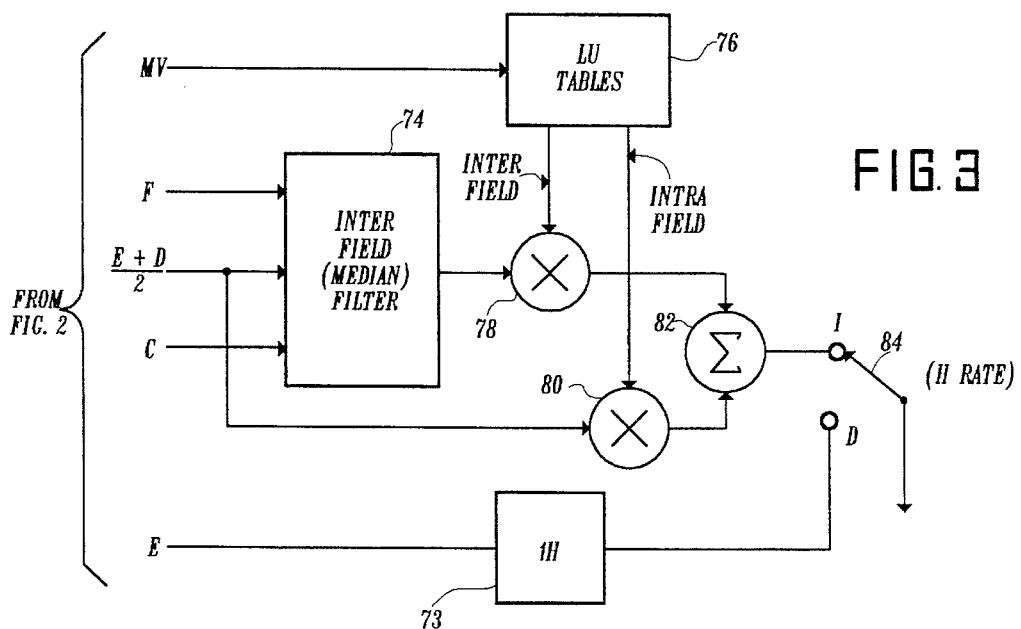
FIG. 3 illustrates circuitry for developing an interpolated pixel using the motion vector and derived signals.

In FIG. 3, the MV output is applied to a block 76 that includes lookup tables for determining the amount or proportion of intrafield and interfield signals to be used in the interpolated pixel, as a function of the value of MV, i.e. how much motion has been detected. The pixels applied to an interfield (median) filter 74 are C, F and (E+D)/2. As reference to FIG. 5 will show, this represents the average of the pixels above and below pixel X (E+D)/2 and the pixels in the same spatial position as the pixel X, but one field earlier (pixel C in field F−1) and one field later (pixel F in field F+1). The average of E+D represents the intrafield pixel or signal. The output of filter 74 is supplied to a multiplier 78 and the intrafield signal (E+D)/2 is applied to a multiplier 80. Multipliers 78 and 80 are controlled by the lookup tables in block 76, which are accessed by the motion value MV to determine the signals applied to the multipliers and hence the blending of the intrafield and interfield signals. The outputs of multipliers 78 and 80 are applied to a summer 82 which is coupled to the I (interpolated) terminal of a switch 84 that is operated at the H rate between terminals I and D (direct pixels). Pixel E is applied to the D terminal of switch 84 through a 1H delay 73. The output of switch 84 is applied to optional matrix 28 (FIG. 1). It will be appreciated that the circuitry of FIG. 3 is replicated for each of the signals Y, U and V, except for the lookup table block 76 which can drive the multipliers for all three signals.

Figure 4:
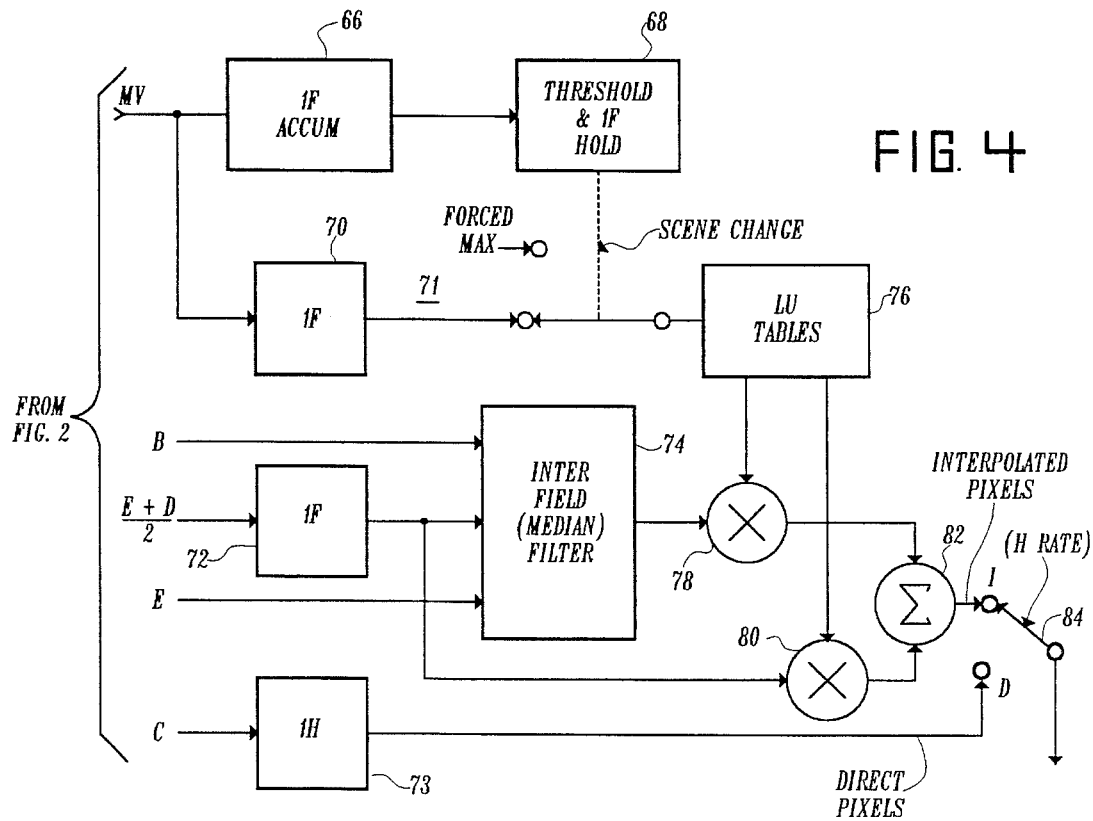
FIG. 4 illustrates a scene change feature of the interlaced-to-progressive scan conversion system.

In the preferred embodiment of the invention shown in FIG. 4, the motion value is supplied to a 1F accumulator 66 and to a 1F delay 70. The output of delay 70 is coupled to a terminal of a switch 71 the common terminal of which is connected to lookup tables in block 76. The output of the accumulator 66 is supplied to a block 68 which is a threshold and one field hold arrangement that controls switch 71 as indicated by the dashed line. Switch 71 is used for scene changes. When a scene change is determined to have occurred (by blocks 66 and 68), the switch 71 is operated to its forced maximum position. Accumulator 68 calculates the sum of one field of motion values for the interpolated pixels. When a threshold level is reached by the sum of the motion values, it indicates the presence of so much motion that a scene change has most likely occurred and that therefore full motion should be assumed. Hence, operation of switch 71 occurs to access appropriate information in the lookup tables in block 76.

As discussed in FIG. 3, the F and C pixel values are applied to interfield (median) filter 74 along with the intrafield pixel value (E+D)/2. Because of the one field delay associated with accumulator 66, however, these values must also be delayed by one field. This is readily accomplished by using the values B and E, respectively, instead of F and C and incorporates a 1F field delay 72 for intrafield pixel value (E+D)/2. Basically, the F and C to points from the serial delay line in FIG. 2 are moved one field to the right (yielding E and B, respectively). This saves on the number of 1F delays required to implement the scene change feature.

The delayed intrafield value is also supplied to a multiplier 80 as for the case of FIG. 3. The output of interfield filter 74 is coupled to multiplier 78 and the outputs of multipliers 78 and 80 are applied to summer 82 as before. Lastly, the E pixel value with a 1F delay is obtained from FIG. 2, point C and is supplied through 1H delay 73 to the D terminal of horizontal rate switch 84. As in the case of FIG. 3, the 1H delay 73 provides the real pixels during the horizontal line intervals between the lines of interpolated pixels and operation of switch 84 results in alternate lines of real and interpolated pixels being outputted. As mentioned, the preferred form of the invention includes the scene change feature discussed above. In FIG. 4, blocks 72, 73, 74, 78, 80, 82 and 84 must be replicated for each signal Y, U and V whereas blocks 66, 68, 70, 71 and 76 may be common to all three signals.

Figure 6:
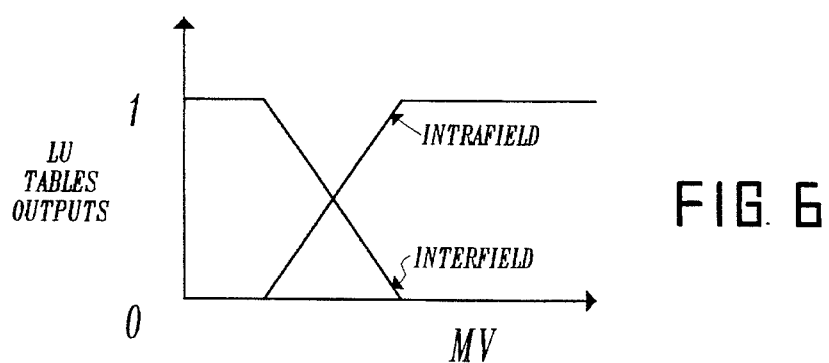
FIG. 6 is a graph illustrating the intrafield and interfield amplitude characteristics as a function of the motion value of the interpolated pixel.

FIG. 6 illustrates the characteristics provided by the lookup tables in block 76. For increasing values of MV, the intrafield signal remains at zero for a predetermined range and rises to a maximum whereas the median or interfield output remains at a maximum for the predetermined range and then falls to zero. The area between the two maximums of the intrafield and interfield signals represents a blending or proportioning of the signals to form the interpolated pixel. The amount of blending depends upon the degree of motion detected as indicated by the value of MV. For low values of MV, the interpolated pixel comprises all interfield signal and at high values of MV, the interpolated pixel comprises all intrafield signal. The sum of the two signals is constant as shown in FIG. 5.

In operation, the Y signal is supplied to a single delay line divided into a series of line and field delays for developing pixels over a five field range, F0, F–1, F–2, F+1 and F+2. A number of calculations are performed to determine the motion value (MV) of each desired or interpolated pixel based upon a number of factors determined from the surrounding pixels. The motion value is selected as the greatest of: the difference between the average of the pixels above and below the interpolated pixel and the corresponding averages of pixels above and below, but one frame earlier and one frame later than the interpolated pixel; and the difference between pixels in the same spatial position as the interpolated pixel, but one field earlier and one field later. This is accomplished by average circuits 48, 50 and 52 and subtractor circuit 58. Similar groups of three inputs are developed for the color signals U and V and the greatest of the nine inputs is selected as the motion value MV of the desired pixel. This motion value is used to access lookup tables which proportion the interfield and intrafield signals in accordance with the characteristic curves shown in FIG. 5 to produce a blended interpolated pixel. The interpolated pixels are displayed alternately with lines of real pixels by virtue of the switch 84 that is operated at the horizontal rate.

The entire operation is further delayed by one field. Thus implementation of the interpolated pixels is held up pending a determination of whether a scene change may have occurred. Should the motion values accumulate to the threshold level established in accumulator 66, block 68 causes switch 71 to its forced maximum position which results in the multipliers 78 and 80 providing only the interfield (median) signal since a scene change is determined to have occurred. This overrides the normal interpolation circuit and precludes erroneous operation in the event of a scene change.

What is claimed is:

1. A method of developing a progressive scan display by interpolation of pixels of a video signal having two interlaced fields of line video comprising:

making available video pixels of said video signal from successive lines in one field and corresponding lines in fields one frame previous to and one frame subsequent to said one field;

determining a motion value from pixels of said video signal in said one field and from pixels in corresponding fields in said one frame previous and said one frame subsequent;

determining an intrafield value from pixels in said video signal in said one field;

determining an interfield value from pixels in said one field and from pixels in the immediately previous and immediately subsequent fields thereto; and developing an interpolated pixel in said one field by proportioning said intrafield value and said interfield value based upon said motion value.

2. The method of claim 1 wherein said intrafield value is determined by averaging the values of pixels in lines above and below the interpolated pixel.

3. The method of claim 2 wherein said motion value is the greater of:

the differences between the intrafield value and the average values of the pixels above and below the interpolated pixel in corresponding locations in said immediately previous field and said immediately subsequent field to the interpolated pixel; and the difference between the values of the pixels in the same spatial location as the interpolated pixel in said immediately previous field and said immediately subsequent field.

4. The method of claim 3 further including exclusively using the intrafield value and the interfield value for a predetermined low motion value and for a predetermined high motion value, respectively.

5. The method of claim 3 further comprising delaying utilization of said interpolated pixel until the presence of a scene change can be determined.

6. A method of interpolating alternate lines of video pixels in a progressive scan system based upon two fields of video pixels in a line interlaced system comprising:

averaging the values of the intrafield pixels immediately above and immediately below a desired pixel to form an intrafield signal value;

subtracting the intrafield signal value from each of the averaged values of the pixels immediately above and immediately below the desired pixel in corresponding fields one frame earlier and one frame later to the field of the desired pixel to form an interfield pixel value;

comparing the values of the pixels in the same spatial position as the interpolated pixel in the immediately prior field and in the immediately subsequent field to the desired pixel;

selecting from the subtractions and the comparison the greatest magnitude to represent the motion value of the desired pixel; and generating the interpolated pixel by proportioning the intrafield pixel value and the interfield pixel value with the motion value.

7. The method of claim 6, further including exclusively using the intrafield pixel value and the interfield pixel value for a predetermined low motion value and for a predetermined high motion value, respectively.

8. The method of claim 7, further comprising delaying utilization of said interpolated pixel until the presence of a scene change can be determined.

* * * * *